G. P. CARROLL.
SAFETY CONTROLLING MECHANISM FOR COMPRESSING MACHINES.
APPLICATION FILED FEB. 2, 1917.
1,273,578.
Patented July 23, 1918.
4 SHEETS—SHEET 2.
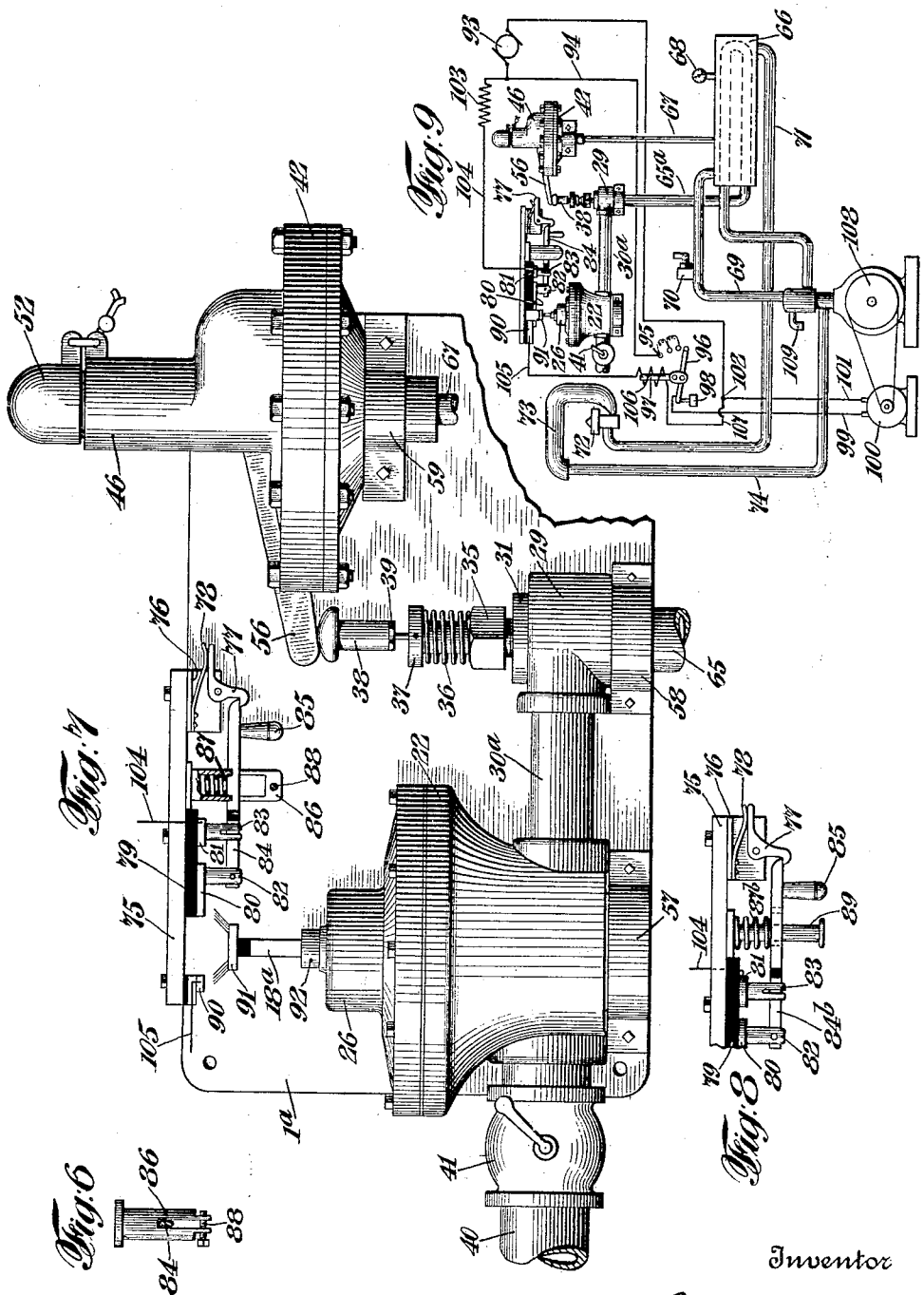

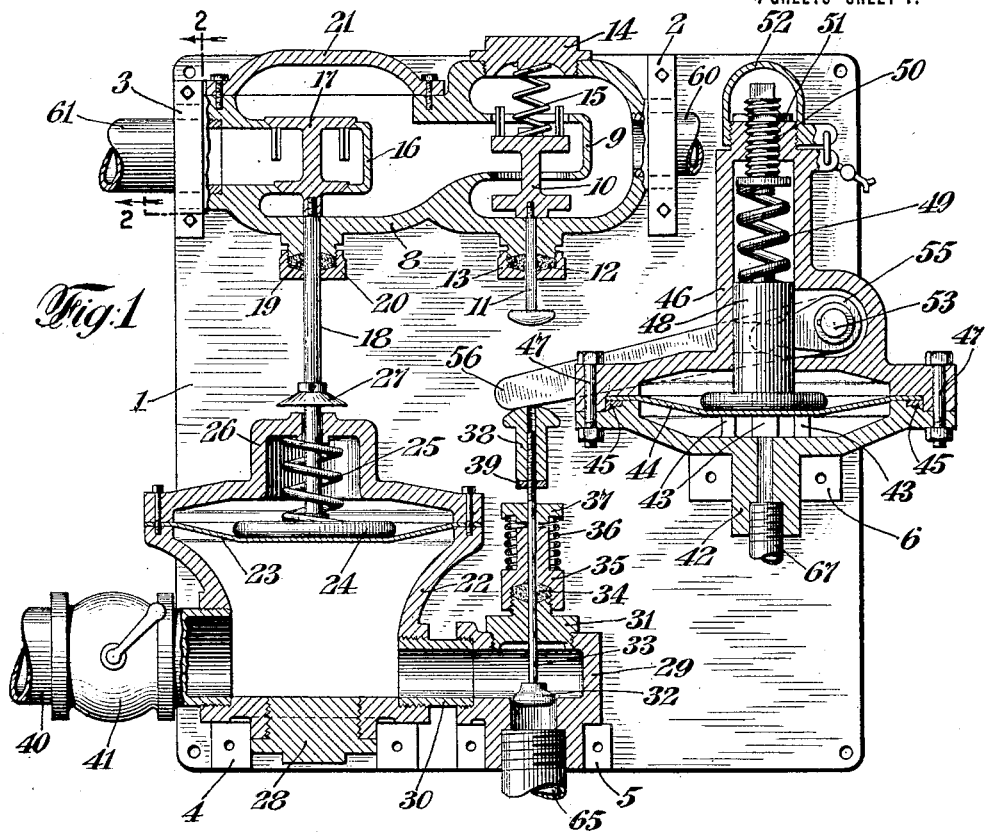

G. P. CARROLL.
SAFETY CONTROLLING MECHANISM FOR COMPRESSING MACHINES.
APPLICATION FILED FEB. 2, 1917.
1,273,578.
Patented July 23, 1918.
4 SHEETS—SHEET 3.
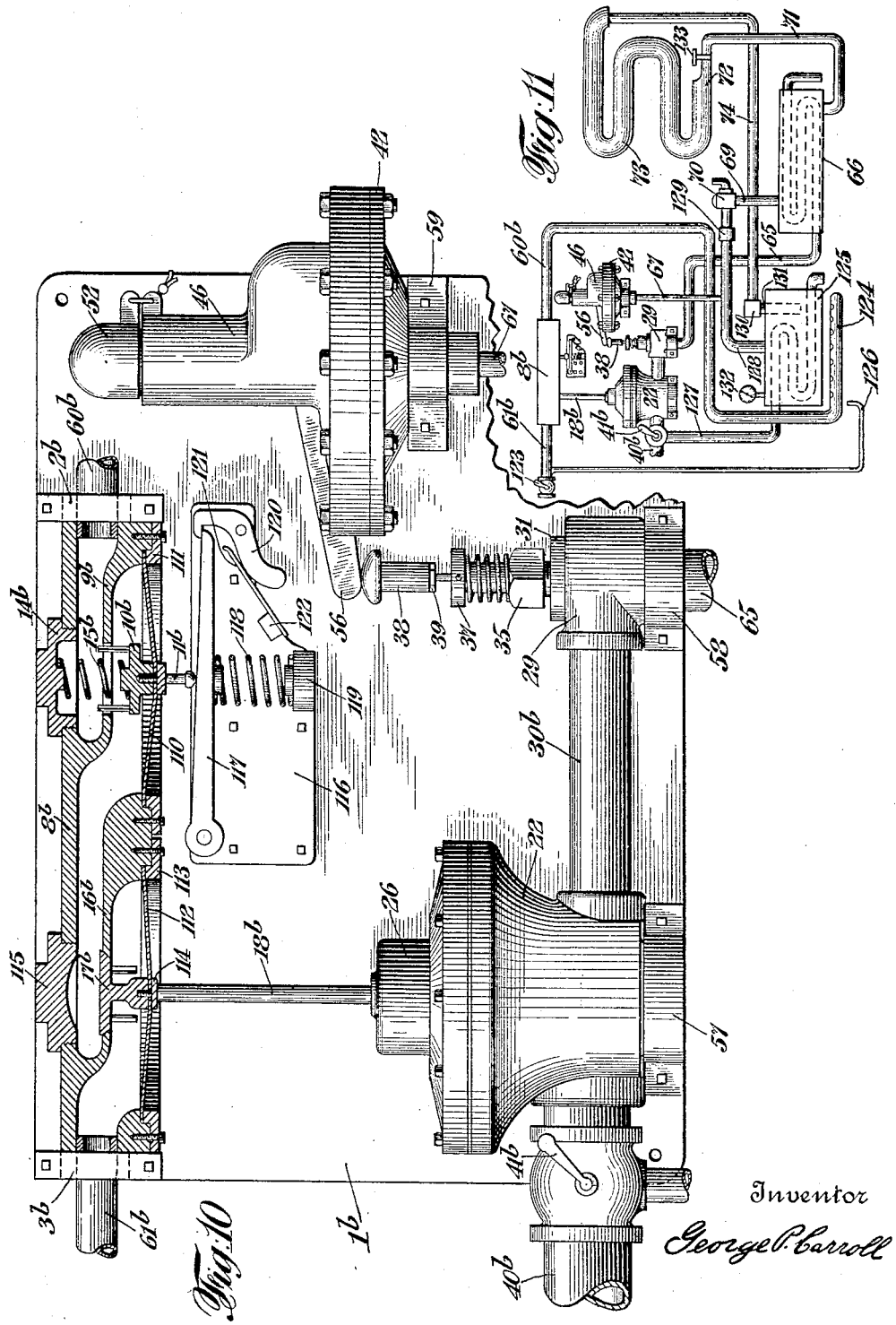

G. P. CARROLL.
SAFETY CONTROLLING MECHANISM FOR COMPRESSING MACHINES.
APPLICATION FILED FEB. 2, 1917.
1,273,578.
Patented July 23, 1918.
4 SHEETS—SHEET 4.
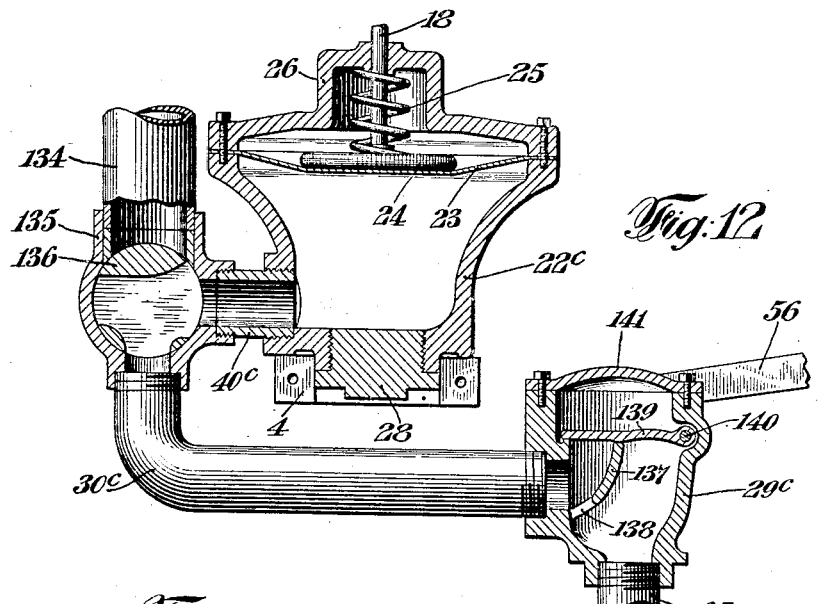
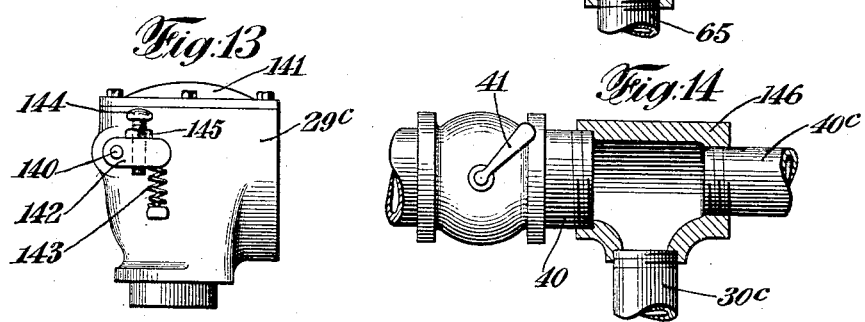
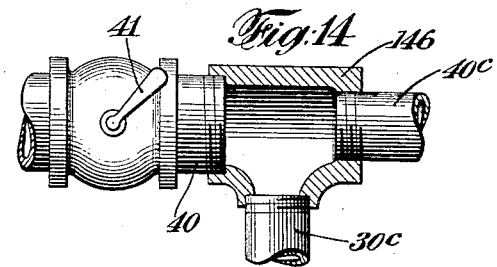
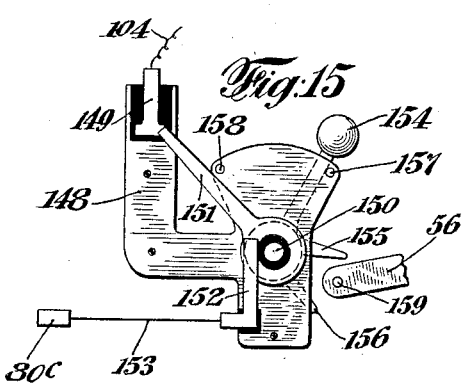
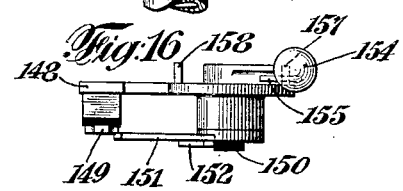
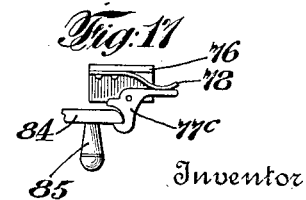
Inventor
George P. Carroll

UNITED STATES PATENT OFFICE.

GEORGE P. CARROLL, OF HARTFORD, CONNECTICUT.

SAFETY CONTROLLING MECHANISM FOR COMPRESSING-MACHINES.

1,273,578.   Specification of Letters Patent.   Patented July 23, 1918.

Application filed February 2, 1917.   Serial No. 146,147.

*To all whom it may concern:*

Be it known that I, GEORGE P. CARROLL, a citizen of the United States, residing at Hartford, in the county of Hartford and State of Connecticut, have invented a new and useful Safety Controlling Mechanism for Compressing-Machines, of which the following is a specification.

My invention relates to improvements in the means for controlling the operation of machines that draw in a fluid in a gaseous or vaporous state and at a low pressure, compress it and force it at high pressure into a condenser where the heat of compression is carried away by a flow of cooling water, usually called the condensing water, with or without a resulting liquefaction of the fluid. The compressing machine employed for such purpose more commonly is some form of force pump, called a compression machine or compressor; but it also may be of the type known as an absorption machine, consisting of a vessel, or a number of vessels, containing an absorbent, usually water, so constructed that the absorbent at about atmospheric temperature draws in the low pressure fluid and then the action of heat separates the fluid from the absorbent and forces it into the condenser. As herein used, the term condenser comprises so much of the system as leads from the discharge valve of the compressor or the absorption machine, as the case may be, and contains the fluid under high pressure, whether in a non-liquefied or in a liquefied state. The fluids circulated in the manner indicated include ammonia, carbon dioxid, sulfur dioxid, air, oxygen and numerous others. Where the condensed fluid is led from the condenser through a small orifice, so that it can expand and take up heat, the compressing machine, of whichever type it may be, is known as a refrigerating machine. But the conditions to which my invention applies also exist in constructions where the fluid is led off from the condenser into containers for transportation and use at a distance. Inasmuch, however, as a refrigerating machine circulating ammonia as the refrigerant is the construction which is typical of all, my invention will be particularly described in connection with such a machine.

The purpose of my invention is to provide simple, compact and reliable mechanism such that the starting and continued operation of a compressing machine is dependent upon the flow of an adequate supply of condensing water, that the flow of condensing water is automatically so graduated as normally to maintain a predetermined head or condenser pressure and that in case of an excessive operating pressure, tending to become dangerous, arising in the condenser of a compression machine or in any part of the high pressure side of an absorption machine, the operation of the machine will be interrupted. The means for accomplishing these purposes will be hereinafter set forth. There are certain detail improvements of construction that will also appear.

The basic principles of my present invention are the same as those disclosed in my pending application Ser. No. 126,019, filed Oct. 16, 1916, entitled Safety construction for refrigerant and other fluid circulating apparatus; and in certain matters the present application is a continuation of and is a division of the former application. Both applications, moreover, in their basic principles are continuations of certain matters of construction disclosed in my pending applications relating to absorption refrigerating machines, each being entitled Refrigerating machine and being severally Ser. No. 794,583, filed Oct. 11, 1913; and Ser. No. 2,865, filed Jan. 18, 1915.

In the drawings, Figure 1 is a representation, partially in front elevation and partially in two parallel vertical sections, of part of the first form of my invention. Fig. 2 is a partial right end elevation and a partial vertical section through the line 2—2 of Fig. 1, looking toward the left. Fig. 3 is a plan view of a detail part of Fig. 1, being the valve 10 therein. Fig. 4 is a plan view of the right end of the lever 56 shown in Fig. 1 and its connections, broken away. Fig. 5 is a diagrammatic representation of the structure of the preceding figures in connection with an engine driven compression refrigerating system. Fig. 6 is a right end elevation of a switch arm guide 86 and a bolt 88 and a vertical section of a guided switch arm 84. Fig. 7 is a front elevation, partially broken away, of part of the second form of my invention, including the parts of the preceding figure. Fig. 8 is a modification of the emergency device shown in the two preceding figures, being the parts 76—88 therein. Fig. 9 is a diagrammatic representation of the structure of Figs. 6 and 7 in connection with an electrically driven compression refrigerating system. Fig. 10 is a representation, partially in front elevation, partially in vertical section and partially broken away, of part of the third form of my invention. Fig. 11 is a diagrammatic representation of the structure of the preceding figure in connection with an intermittent absorption refrigerating system. Fig. 12 is a partial vertical section and a partial front elevation of an alternative form of construction that may be used in place of the lower part of the starter and in place of the water regulator, with their connections, shown in the lower parts of Figs. 1, 7 and 10. Fig. 13 is a rear elevation of the water regulator shown in the right hand part of the preceding figure. Fig. 14 is a partial vertical section and a partial front elevation of an alternative form of construction that may be used in place of the extreme left hand part of the structure of Fig. 12. Fig. 15 is a front elevation of an alternative form of emergency device, with certain related parts, that may be used in place of the emergency device in Figs. 6 and 7 or of Fig. 8. Fig. 16 is a plan view of the structure of the preceding figure. Fig. 17 is a front elevation of an alternative form of construction that may be used in place of a detail part of the emergency device of Fig. 7.

First considering the construction of Figs. 1–5 and the lower parts of Figs. 7 and 10: A back plate 1, which may be attached to any convenient vertical surface by bolts passing through bolt holes near its corners, has projecting from its upper part, and immediately behind straps 2 and 3, two brackets. As shown in Fig. 2, the bracket of the plate 1 behind the strap 3, the other bracket being similar, has in its front end a square horizontal transverse recess. A bracket 4 projects frontward from the lower edge, at the left of the plate 1, and has at its front end a semi-circular vertical transverse recess. To the right of the bracket 4, a narrower bracket 5, with a similar recess, projects frontward from the plate 1. Just below the right central part of the plate 1, another bracket 6 projects frontward and has a similar recess. Above the bracket 6, a shaft support 7, shown in Fig. 4, projects frontward from the plate 1.

A valve casing 8 has squared right and left ends fitting into the recesses back of the straps 2 and 3, respectively, and between the ends it is of somewhat reduced diameter. The straps 2 and 3 are bolted to the adjacent brackets of the plate 1 so as firmly to secure the casing 8. Extending to the right from the wall of the casing 8, near to where the casing is of reduced diameter, is a tube-like partition 9, closed at its right end and having vertical ports of equal diameter extending through the flat upper and lower walls of the partition. A balanced double disk slide valve 10, called the emergency valve, is adapted to slide upward and by means of its disks loosely to close the ports of the partition 9; and it has, extending upward from near the circumference of the upper disk, three guides, as shown in Fig. 3. A stem 11, headed at its lower end, passes upward through an opening in the under side of the casing 8 and screws into the center of the lower disk of the valve 10. A projection on the under side of the casing 8, through which the stem 11 passes, is provided with a stuffing box recess, containing packing 12, which is secured in place around the stem by a gland nut 13. A threaded opening in the upper wall of the casing 8 is in axial alinement with the ports of the partition 9, but is of slightly greater diameter than the ports and is closed by a nut plug 14. A compression spring 15 bears at the top on the under side of the plug 14 and at its lower end on the center of the upper disk of the valve 10 and has a thrust sufficient to force the valve and the stem 11 into the downward position shown, unless opposed by stronger force applied upward to the head of the stem. The parts 9–15 constitute the first form of emergency device.

Extending to the right from the wall of the casing 8, near its left end, is a tube-like partition 16, closed at its right end, with flat upper and lower walls, and having in these walls beveled valve seats, opening upward, the diameter of the upper seat being a little greater than the diameter of the lower seat. A so-called balanced double disk beveled valve 17, called the supply valve, is adapted to close, as shown, the seats of the partition 16; and it has, extending downward from near the circumference of the upper disk, guides, similar to the guides of the valve 10. A stem 18 passes upward through an opening in the under side of the casing 8 and screws into the center of the lower disk of the valve 17. A projection on the under side of the casing 8, through which the stem 18 passes, is provided with a stuffing box recess, containing packing 19, which is secured in place around the stem by a gland nut 20. A plate 21 is bolted to the top of the casing 8 so as to close an opening in the casing considerably larger than the widest diameter of the valve 17.

There is, therefore, a continuous passage from the right end to the left end of the casing 8, through the partitions 9 and 16, that can be closed either by the valve 10 or by the valve 17. The left end of the casing 8 might be connected up as the inlet; but where a high pressure fluid, such as steam, is to be transmitted, it is better to connect the right end as the inlet, in order that the steam pressure may have a slight tendency to keep closed the valve 17. In case of such latter connection, if the valve 10 is closed in the manner that will be described, there is also, by reason of the stem 11 passing through the wall of the casing 8, a slight tendency of the steam pressure to assist the spring 15 in opening the valve.

A reservoir casing 22, flaring outward at the top, at the bottom fits into and rests upon the bracket 4. A quite flexible diaphragm 23, which may be of rubber or preferably of phosphor bronze, closes the top of the casing 22 and supports a disk 24, secured to the lower end of the stem 18. A compression spring 25 surrounds the lower part of the stem 18, bears at its lower end against the disk 24 and bears at its upper end against the under side of a cover casing 26 that is bolted to the casing 22 so as to clamp the circumference of the diaphragm 23. The thrust of the spring 25 is sufficient to seat the valve 17, unless overcome by a stronger pressure of water exerted upward upon the under side of the diaphragm 23. The downward movement of the parts 17, 18, 25, 24 and 23 is limited by the seating of the valve 17 and the upward movement of these parts is limited by the disk 24 striking the casing 26, after the valve has been fully unseated, but before it can strike the plate 21. An annular shield 27, with a downward flare, is detachably secured to the stem 18 just above the casing 26, so as to protect the interior of the casing against any moisture trickling down the stem. A nut plug 28 screws into a threaded opening in the bottom of casing 22. The parts 17, 18, 27, 26, 25, 24, 23, 22 and 28 constitute the first form of starter.

A casing 29 at the bottom fits into and rests upon the bracket 5 and at its upper left side connects with a horizontal coupling 30 leading from the lower right side of the casing 22. An outlet passage leads downward through the bottom of the casing 29 and is of the same diameter as the passage from the interior of the casing 22 through the coupling 30 into the casing 29. A threaded opening in the top of the casing 29, in axial alinement with the outlet passage of the casing, is closed by a nut plug 31, having a stuffing box recess at the top. A throttling valve 32 has a convex circumference and a flat top and is of a diameter so much less than the diameter of the outlet of the casing 29 that, when the valve is in the position shown at the top of the outlet or is in any lower position, the annular space between the valve and the wall of the outlet will permit of a flow of water about sufficient for minimum requirements, as will be later explained. A stem 33 is secured to the upper center of the valve 32, passes upward through an opening in the plug 31 and is threaded around the top. Packing 34, in the stuffing box of the plug 31, surrounds the stem 33 and is secured in place by a gland nut 35, having a sleeved extension on top. A compression spring 36 surrounds the extension of the nut 35 and bears at its lower end upon the main part of the nut and at its upper end upon the under side of a collar 37, detachably secured to the stem 33. With the parts in the positions shown, the collar 37 compresses the spring 36, but does not quite strike the extension of the nut 35. If the collar 37 should be forced downward so as to rest upon the extension of the nut 35, the effect simply would be, by means of the stem 33, to force the valve 32 a little farther down in the outlet passage on the casing 29, without lessening the flow therethrough. And any further downward movement of the valve 32 would be limited by the collar 37 striking the extension of the nut 35. A sleeved head 38, having a central threaded opening extending from top to bottom, surrounds the threaded top of the stem 33 and is held in a predetermined position of adjustment by a lock nut 39 at its lower end. While the ultimate downward movement of the valve 32 is limited, as just stated, by the collar 37 striking the extension of the nut 35, up to that limit the extent of the possible downward movement of the valve, in the course of operation to be described, may be varied by adjustments up or down of the head 38 and the collar 39. The upward movement of the valve 32 is limited by its striking against the under side of the plug 31. The thrust of the spring 36 is sufficient to force the parts 37, 33, 39, 38 and 32 upward into the position where the valve 32 is in contact with the plug 31, unless overcome by a stronger force applied downward upon the head 38. When the valve 32 is forced upward, even before it reaches the plug 31, the passage through the casing 29 is open to the maximum. The parts 29, 31, 33, 32, 34, 35, 36, 37, 39 and 38 constitute one form of water regulator.

A pipe 40 is to be connected to lead from a source of cooling water, such as the street mains, into the lower left side of the casing 22 and may be controlled by any approved kind of valve, the valve 41 being a diagrammatic representation of such a valve. The capacity of the pipe 40 and the valve 41 is very considerably greater than the capacity of the coupling 30 and the passages leading therefrom, even with the valve 32 in its highest position, so that, however much may be the outflow from the casing 22, the inflow into the casing, under normal conditions of flow when the valve is open, will force upward the diaphragm 23 and the connected reciprocating parts so as to open the valve 17. And this result cannot be affected by any throttling of the flow of water at any point beyond the casing 29.

A lower casing 42, widely flanged so as to form a shallow chamber on top, at the bottom fits into and rests upon the bracket 6; it has a small vertical passage through its axial center; and it has stops 43 at the top of the passage extending upward within the chamber. A diaphragm 44, preferably of very thin vanadium steel, near its circumference rests upon a ring at the top of the casing 42 and at its circumference rests upon an annular gasket 45, preferably of soft lead, lying on the downwardly sloping rim of the casing just outside the ring. The diaphragm 44 may be forced downward at the center, as shown, until it there rests upon the stops 43. There are passages between the stops 43 so that fluid under pressure may be transmitted back and forth between the space under the diaphragm 44 outside of the stops and the passage at the axial center of the casing. The diaphragm 44 is preferably of vanadium steel because that material remains intact under high pressure and is also freely responsive in its movements to very slight changes of pressure. An upper casing 46 has a flange that fits over so much of the diaphragm 44 as rests upon the casing 42 and the gasket 45 and it has at its extreme circumference an annular tongue inclosing the outer vertical surfaces of the diaphragm and the gasket. By means of bolts 47 the casings 42 and 46 are clamped together at their circumferences and press the edge of the diaphragm 44 and the gasket 45 down upon the casing, the gasket being originally a little higher than the rim of the casing, so as to make a gas tight joint. The casing 46 has in its under side a shallow chamber of equal diameter with the chamber in the top of the casing 42; it has at its axial center a cylindrical chamber extending upward from the shallow chamber nearly to the top; it has a small threaded passage at its axial center extending through the top; and it has a space to the lower right hand side of the cylindrical chamber from which a horizontal shaft passage extends through the rear wall. A reciprocating member 48 has a flange at the lower end resting upon the center of the diaphragm 44 and of a diameter greater than that of the stops 43; above its flange it is adapted to reciprocate within the lower end of the cylindrical chamber in the casing 46; and it has in the part so reciprocating a transverse passage extending from left to right. Just as the stops 43 limit the downward movement of the center of the diaphragm 44 and of the member 48 resting upon the diaphragm, so the upward movement of the member would be limited, in case of extremely high pressure on the under side of the diaphragm, by its flange striking the wall of the casing 46 around the lower end of the cylindrical chamber therein. A heavy compression spring 49 occupies the upper end of the cylindrical chamber in the casing 46 and it bears, at the lower end, upon the top of the member 48 and, at the upper end, upon the head of a threaded bolt 50 passing upward through the passage in the top of the casing 46. The end of the bolt 50 above and outside the casing 46 has a square wrench section whereby the bolt may be turned up or down and it is held in any desired position by a lock nut 51 just above the top of the casing 46. It is evident that, upon loosening the nut 51, the bolt 50 may be screwed downward so as to increase the thrust of the spring 49, or it may be screwed upward so as to decrease the thrust. A cap 52 screws around the threaded top of the casing 46, which is of reduced diameter, and over the nut 51 and the exposed end of the bolt 50. Projecting to the right of the lower end of the cap 52 is a lug with a transverse hole through it and projecting to the right of the top of the casing 46, just under the former lug, is a similar lug with a transverse hole through it. A wire may be passed through the holes of the lugs of the cap 52 and the casing 46 and then sealed so as to prevent any tampering with the bolt 50 and the nut 51 after they have been adjusted, or a padlock may be used for the same purpose. A rock shaft 53 is journaled at its rear end in the front end of the support 7, as shown in Fig. 4; it enters the rear wall of the casing 46 through a stuffing box gland nut 54; and it has secured to its front end within the casing a short lever 55 that has its free end within the recess of the member 48. A long lever 56 is secured to the shaft 53 between the nut 54 and the support 7 and at its outer end is adapted to bear successively upon the head 38 and the stem 11. The parts 46–56 constitute one form of controller.

In Figs. 7 and 10 the water regulator and the controller and so much of the starter as is inclosed are of the same construction as in Figs. 1 and 4. In the latter figures, a semicircular strap 57 at its ends is bolted to the bracket 4 so as to secure the casing 22; a similar strap 58 secures the casing 29 to the bracket 5; and a similar strap 59 secures the casing 42 to the bracket 6. And these straps, therefore, are to be understood as also belonging to the construction of Figs. 1–4.

It will be noted that the central planes of the casing 8, of the casings 22 and 26 and of the casing 29, with their immediately related parts, are all in the same plane with one another and with the central plane of the lever 56, as indicated in Figs. 2 and 4.

But the central plane of the casings 42 and 46 is farther to the front, as indicated in Fig. 4.

With the elements thus far considered connected as shown in Fig. 5, a pipe 60 leads from a steam boiler, not shown, into the right end of the casing 8 and a pipe 61 leads from the left end of the casing into the steam cylinder of a horizontal steam engine 62, connected to the crank shaft pin of a fly wheel 63. Nearly in alinement with the engine 62, is a horizontal double acting compressor 64, also connected to the same pin. From the casing 29 a condenser water piping 65 leads downward into the lower left end of a condenser tank 66, coils upward therein and emerges from its upper right end. A narrow pipe 67 connects the casing 42 with the top of the tank 66. A gage 68 indicates the pressure in the tank 66 and certain connected piping. From the discharge valves at each end of the compressor 64 a discharge pipe 69 leads into the top of the tank 66 and has connected with it a relief valve 70. From the under side of the tank 66, a liquid pipe 71 leads to an expansion valve 72, preferably of the automatic type. An expansion chamber, evaporator or expansion coil 73, as it is variously called, leads from the valve 72 and discharges into a suction pipe 74, which leads to the suction valve of the compressor 64. This type of engine and compressor is chosen for illustration because it is built in units having refrigeration capacities running up to 500 tons and over and because the first form of my invention is especially adapted for steam pipes of large diameter.

The part of the pipe 40 to the right of the valve 41 and the parts 22, 23, 28, 30, 29 and 31 constitute one form of water reservoir draining into the piping 65 and may be of any necessary or proper capacity; and the valve 41 represents one form of means for supplying a flow of cooling water to the reservoir. The parts 65, 66, 67, 42, 43, 44, 68, 69 and 71 represent a condenser, including water piping therefor, which may be a double pipe counter current condenser, an atmospheric condenser or any other kind of condenser. The compressor 64 is one form of forcing means for forcing fluid into the condenser.

The method of operation is as follows: Let it be assumed that the relief valve 70 is set to blow off at some limit between 250 and 300 pounds pressure, as is proper in case of ammonia, and that 180 pounds is the desired maximum head pressure to be maintained, as will be indicated by the gage 68. In the cooler months of the year, when the condensing water is cool, and with the compressor 64 operating at a low back pressure, that is to say with an adjustment of the valve 72 such that the gas coming from the pipe 74 is of low pressure, so as to result in a minimum load for the compressor, the quantity of water flowing past the valve 32 in the position shown will be about sufficient to maintain a head pressure of 180 pounds, as will be explained. If the quantity of water flowing past the valve 32 is a little too much, the only effect will be that, under the minimum requirements indicated, a little lower head pressure will be maintained and a little more condensing water will be used than will be strictly necessary. And such a condition could be easily rectified by substituting a valve 32 of larger diameter. If on the other hand, the quantity of water flowing past the valve 32 in the position shown is not enough for the minimum requirements, the only effect will be that the valve will be lifted automatically, as will be explained, sufficiently to maintain the predetermined head pressure, a little earlier than otherwise. It is also assumed that the condenser is of sufficient capacity to cool the hot gas discharged through the pipe 69 into the tank 66 under the maximum requirements of operation, that is to say in the heat of summer, with the condensing water at the warmest, and with a high back pressure. Then, as also assumed, the passages through the coupling 30 and the casing 29, with the valve 32 sufficiently lifted, are sufficient to transmit the maximum quantity of water required by the condenser.

Now assume that the compressor 64 is to be operated under conditions requiring the minimum flow of condensing water. On opening the valve 41, water rushes into the casing 22 and in part flows through the coupling 30, the casing 29 and the piping 65, so as to cool the interior of the tank 66, and discharges at the outlet end of the pipe. But the part of the water entering the casing 22, and unable to flow away, presses upward upon the diaphragm 23 so as to open the valve 17. Thereupon steam passes through the pipe 60, the casing 8 and the pipe 61 so as to operate the engine 62 and the compressor 64. Thereupon the compressor 64 draws expanded ammonia from the pipe 74 and forces it under high pressure through the pipe 69 into the tank 66. The temperature and pressure in the tank 66 consequently tend to rise very greatly, but this tendency is counteracted by the cooling effect of the water flowing through the piping 65 so that the ammonia in the lower part of the tank 66, in consequence of pressure and cooling, is liquefied. With the withdrawal of expanded ammonia from the pipe 74 into the compressor 64, the pressure in the chamber 73 tends to drop, so that liquid ammonia from the tank 66 and the pipe 71 passes the valve 72, and, vaporizing, produces the desired refrigerating effect in the compartments, not shown, which inclose the chamber. The same results would follow with a plurality of expansion chambers in parallel, each provided with its own expansion valve. When it is desired to terminate the period of refrigeration, the valve 41 is closed so that no more water can enter the casing 22. But as water still flows away through the piping 65, a vacuum tends to be created under the diaphragm 23 and the spring 25 thereupon closes the valve 17, so as to shut off the steam supply to the pipe 61. Thereupon the engine 62, the fly wheel 63 and the compressor 64 begin to slow down and finally stop. But while the parts 62, 63 and 64 are slowing down, after the steam supply has been shut off, under the momentum of the moving parts, the compressor 64 is still discharging hot gas into the condenser. If, under such circumstances, the flow of water through the piping 65 had been simultaneously shut off, the tendency would have been to create a head pressure high enough to open the valve 70 and thus to release some of the ammonia charge, or, if the valve 70 were omitted, to produce a dangerous pressure in the system. But this tendency, in my construction, is counteracted by the provision of the reservoir, which continues to supply water to the piping 65 between the time that the steam supply is shut off and the time when the compressor 64 and the driving means therefor come to rest. It also will happen from time to time that, while the valve 41 is open, there will be an accidental interruption of the flow of water entering the reservoir. Here, again, the tendency would be to produce a high or dangerous pressure. But such an interruption, in my construction, has the same results, in shutting off the steam and in providing from the reservoir a supply of water until the compressor 64 comes to rest, as does the closing of the valve 41. But, in the case of an accidental interruption of the water supply, when the water again flows into the casing 22, the upward pressure on the diaphragm 23 opens the valve 17 and automatically starts the compressor 64. It is also to be noted that whenever a flow of water is admitted to the reservoir, water begins to flow into the piping 65 before pressing upon the diaphragm 23, thus making certain some cooling of the condenser even before it can receive any hot gas.

Now suppose, as is more frequently the case, that the flow of water past the valve 32 in the position shown is insufficient to keep the head pressure down to 180 pounds. Then, as the pressure indicated by the gage 68 rises, the pressure of fluid transmitted through the pipe 67 upon the diaphragm 44 forces the diaphragm, the member 48 and the lever 55 upward, in opposition to the spring 49, so as to rotate the shaft 53 and the lever 56 slightly upward. The effect is that, as the lever 56 tends to cease pressing on the head 38, the spring 36 tends to act on the collar 37 so as to lift the valve 32. More water thereupon tends to flow to the condenser, the pressure on the diaphragm 44 tends to lessen and the spring 49 tends to force downward its controlled parts so as to depress the valve 32 and to diminish the flow of water past it. An equilbrium is thus established so as to maintain the head pressure of 180 pounds. The primary adjustment is made by means of the bolt 50 and the nut 51 and the secondary adjustment, so as to maintain the particular head pressure desired, is made by turning the head 38 and the nut up or down. After the primary adjustment had been made, the cap 52 and the casing 46 would properly be sealed or locked, as has been indicated, and then any operator of the machine would be free to make such secondary adjustment as might be desired. Where the valve 32 acts to graduate the flow of condensing water, the operation in all other respects upon opening or closing the valve 41 and upon a cessation of the water supply is the same as has been described.

Such is the normal course of operation. But it sometimes happens that the condenser piping gets foul, or non-condensable gases find lodgment in the condenser, or it develops as the summer comes on that the condenser is too small or improperly designed, so that even the maximum flow of condensing water is insufficient to keep the head pressure down to 180 pounds. Under such circumstances the lever 56 rises above the point where the spring 36 can be effective in permitting the flow of more water until finally the lever bears upon the stem 11 and begins to close the valve 10. The effect of a partial closing of the valve 10 is to slow down the engine 62 and the compressor 64 so that less hot gas is forced into the tank 66 and the maximum supply of condensing water suffices to prevent any further rise of pressure. Under such circumstances the engine 62 operates as a variable speed engine and the compressor 64 operates as a variable speed compressor. The slowing down of the engine 62, the condition of pressure indicated by the gage 68 and the position of the lever 56 each will indicate the need of discovering and remedying the cause of high pressure and each of these indications will be observable before there is more than a partial stoppage of the process of refrigeration. In my opinion the lever 56 should be so adjusted that it will begin to throttle the valve 10 when the condenser pressure rises say to 210 or 220 pounds. If the pressure ranges above 180 pounds, the engineer, in case of such an adjustment, will almost always have the opportunity to discover the cause and to remedy the difficulty before the valve 10 begins to be throttled. There may, however, be a sudden stoppage of the flow of water at some point beyond the casing 22 that will quickly result not merely in the throttling of the valve 10 but also in its complete closing, so as to shut off the steam supply as effectually as when the valve 17 closes in the manner that has been described. It will be noted that the adjustment of the controller by means of the bolt 50 and the nut 51, in securing a throttling and, if necessary, an ultimate closing of the valve 10, is entirely independent of any other adjustment. Then, after the controller has been adjusted, the water regulator, by means of the head 38 and the nut 39, may be adjusted, as has been described, so as to secure the maximum flow of condensing water at any head pressure limit. The pipe 67 is so connected that the controller acts on the water regulator and the emergency device, in the manner that has been described, in response to all changes of pressure in the part of the refrigerant circuit between the discharge valve of the compressor 64 and the valve 72.

But an excessive pressure in a refrigerating system, that may ultimately result in an explosion, can arise from external conditions. In case of a fire involving the plant, the lever 56 would close the valve 10 so as completely to stop the process of refrigeration, if the engine 62 should then be running, and, if the pressure should rise to 300 pounds, which corresponds to a temperature of 125 degrees F., the valve 70, if set to the 300 pound limit, would blow off and the ammonia escape into the atmosphere, the pipe from the valve in actual practice having its outlet outside of the building. The valve 70 is to be provided both to guard against the contingency of fire and also because the ordinances in an increasing number of cities require such a valve.

In the subsequent part of this description all parts identical in construction with the parts already considered will be indicated by the same numerals of reference, without further explanation, and those parts that are similar to those already considered will be indicated by a letter after each numeral of reference and will be briefly explained.

Next considering the construction of Figs. 6–9: A back plate 1ª entirely omits the brackets at the top and has the brackets 4 and 5, back of the straps 57 and 58, farther apart, so that the coupling 30ª is longer. A top plate 75, bolted to the top of the plate 1ª, projects frontward and has secured to its under side, at the right, an angle bracket 76. A bell crank lever 77 is pivoted to the vertical part of the bracket 76; it has a horizontal arm extending to the right and situated so that its right end is in the path of the left end of the lever 56, when the latter lever ascends; and it has a vertical arm with a catch on the left side at the lower end. A flat spring 78, secured to the horizontal part of the bracket 76, bears upon the upper right end of the horizontal arm of the lever 77 so as to tend to rotate the lever clockwise. An insulating block 79 is secured to the central lower part of the plate 75 and has on its under side conducting blocks 80 and 81, spaced a little way apart. From the right end of the bracket 80 there depends a pivot post 82 and from the bracket 81 there depends a split sliding contact post 83. A switch arm 84 is pivoted to the lower end of the post 82; it is adapted, as shown, when elevated to make a sliding contact between the split parts at the lower end of the post 83; it has an insulated section just to the right of the post 83; it has a right end adapted for engagement with the catch of the lever 77 so as to be held in contact with the post 83; and it has a depending handle 85 near to its right end. In Fig. 7, secured to the under side of the plate 75, between the block 79 and the bracket 76, is a hollow cylindrical depending switch arm guide 86, having, as best shown in Fig. 6, a transverse vertical split extending from above the center to the lower end and adapted to guide the arm 84, when dropping and when subsequently lifted. A compression spring 87, within the upper part of the guide 86, bears upon the arm 84 and assists gravity in tending to cause the arm to drop. A bolt 88, passing through the lower ends of the split parts of the guide 86 prevents the arm from dropping too far, but permits it to clear the post 83. The parts 76—88 constitute the second form of emergency device.

In the slightly different form of construction shown in Fig. 8, the switch arm 84ᵇ has a rather wide vertical slot, as measured from left to right. A post 89, having a wide head at its lower end, extends through the slot of the arm 84ᵇ; it is secured at its upper end to the under side of the plate 75, in the same position as is the guide 86 in Fig. 7; and it has around its upper part, above and bearing down upon the arm, a compression spring 87ᵇ.

The left end of the block 80 has a contact surface on the under side. A contact block 90 is secured to the left under side of the plate 75, but is insulated therefrom. The top of the stem 18ª is insulated and carries above the insulation a switch 91, adapted to make contact with the blocks 80 and 90 and to connect them. A collar 92, secured to the stem 18ª, is adapted to rest on top of the casing 26, as shown, so as to limit the downward movement of the connected reciprocating parts in the same manner as does the valve 17 in the prior construction. The parts 91, 18ª, 92, 26, 25, 24, 23, 22 and 28 constitute the second form of starter.

With the elements now being considered, exclusive of the modifications of Fig. 8, connected as shown in Fig. 9, from a generator 93, a wire 94 leads to the upper one of a series of contacts 95 connected to one another by divisional or sub-resistances. An arm 96 is pivoted near its left end, but is insulated from the pivot; it is pivoted near its center to a solenoid core 97, but is insulated therefrom; and at its right end it operates, upon the energization of the core, to make contact with the contacts 95, in ascending order, so as to cut out the resistances between the contacts successively. A dash pot device 98 is pivoted to the left end of the arm 96 and is operative to retard the upward movement of the right end of the arm. From the arm 96, near its pivot, a wire 99 leads to an electric motor 100 and from the motor a wire 101 leads through a point 102 back to the generator 93. From the wire 94, a resistance 103 leads to a branch wire 104, which leads to the block 81. From the block 90, a wire 105 leads to a solenoid winding 106, adapted to energize the core 97. From the winding 106 a wire 107 leads to the point 102. The motor 100 drives a vertical compressor 108, which is another form of forcing means for forcing fluid into the condenser. The pipe 74 leads to the suction valve of the compressor 108 and from the discharge valve of the compressor the discharge pipe 69 leads into the top of the tank 66. The piping 65ª, after emerging from the tank 66 at the upper left end, enters the lower part of the water jacket of the compressor 108; and from the opposite upper part of the water jacket a pipe 109 discharges to the waste.

The method of operation of this second form of construction is as previously described, with, however, the following modifications: On opening the valve 41, resulting in closing the switch 91, a current passes from the generator 93 through the parts 94, 103, 104, 81, 83, 84, 82, 80, 91, 90, 105, 106, 107, 102 and 101 back to the generator, so as to energize the core 97. Thereupon the arm 96 makes contact with the contacts 95, cutting out the successive resistances, until the full current passes from the generator 93 through the parts 94, 95, 96, 99, 100, 101 and 102 back to the generator and, as a consequence, the motor 100 and the compressor 108 are running at full speed, with a cooling of the interior of the tank 66 and the production of refrigeration as before. Upon the closing of the valve 41, or upon a material interruption of the supply of water entering the casing 22, the spring 25 opens the switch 91. The core 97 being thus de-energized, the arm 96 makes contact with the contacts 95 in descending order, throwing in the successive resistances, until finally all current is shut off and the motor 100 and the compressor 108 stop. In the interval between the opening of the switch 91 and the stopping of the compressor 108, the reservoir leading into the piping 65ª, as before, supplies water for the cooling of the hot gas forced into the tank 66 while the compressor is coming to rest. Suppose that the water regulator and the controller are so adjusted that the head pressure is normally maintained at 170 pounds and that the lever 56 bears upon the lever 76 at a pressure of 200 pounds. Then, when the gage 68 shows a pressure in excess of 170 pounds and the lever 56 is in a position somewhere between the head 38 and the horizontal arm of the lever 77, there is a sufficient warning, as before, of an abnormal condition in the system that should be rectified. If this warning is neglected, on the condenser pressure rising to 200 pounds, the lever 56 trips the lever 77 so as to release the arm 84 or 84ᵇ, as the case may be. Thereupon, in Figs. 6 and 7, the spring 87, assisting gravity, depresses the arm 84 so as to break contact with the post 83, but the bolt 88 stops the further downward movement of the arm. The breaking of contact between the arm 84 and the post 83 has the same effect as does the opening of the switch 91. In Fig. 8, the tripping of the lever 77 causes the spring 87ᵇ to act on the arm 84ᵇ, in the same way as does the spring 87 and the head of the post 89 has the same stopping effect as does the bolt 88. When the abnormal condition in the system has been rectified, the handle 85 is used to close the arm 84 or the arm 84ᵇ as the case may be, in opposition to the spring 87 or the spring 87ᵇ, as the case may be, the lever 77 at the same time being manually turned counter-clockwise, for an instant, in opposition to the spring 78.

Instead of the manually operated valve 41, if preferred, there may be substituted the thermostatically controlled construction disclosed in Fig. 8, and in the description relating thereto, of my aforesaid application Ser. No. 126,019.

The starting rheostat composed of the parts 95, 96, 97, 98 and 106 is to be taken as representative of the starting rheostats, commonly called self starters, of all electric motor and compressor combinations, the compressors in such combinations having refrigerating capacities ranging from a fraction of a ton up to 300 tons or over. In all such rheostats, the closing of a branch circuit operates, by means of mechanism usually of greater complexity, to cut out successive resistances and to turn on the full current and the opening of the branch circuit operates to throw in the resistances and finally to shut off the current completely.

Next considering the construction of Figs. 10 and 11: A back plate $1^b$ has projecting from its upper part, and immediately behind straps $2^b$ and $3^b$, two brackets of a construction similar to that already described, but spaced farther apart; and it has the brackets 4 and 5, back of the straps 57 and 58, farther apart, so that the coupling $30^b$ is longer. A valve casing $8^b$ has squared right and left ends fitting into the square recesses back of the straps $2^b$ and $3^b$ and is of about the same uniform diameter throughout its entire length.

A partition $9^b$ extends horizontally from the upper part of the casing $8^b$, to the right of the center, toward its right end below the inner end of the pipe $60^b$, and it has a vertical port. A disk slide valve $10^b$, called the emergency valve, is adapted to slide upward and by means of its disk to close the port of the partition $9^b$; and it has, extending upward from near the circumference of the disk, guides, as before. An opening in the under side of the casing $8^b$ in axial alinement with the port of the partition $9^b$, and of much greater diameter, is closed by a diaphragm 110, preferably of phosphor bronze, which is held in place at the circumference by a ring 111, bolted to the casing. A very short stem $11^b$, headed at its lower end and slightly flanged just below the diaphragm 110, passes upward through the center of the diaphragm and screws into the center of the lower end of the valve $10^b$. A threaded opening in the upper wall of the casing $8^b$ is in axial alinement with the port of the partition $9^b$, but is of slightly greater diameter than the port, and is closed by a nut plug $14^b$. A compression spring $15^b$ bears at the top on the under side of the plug $14^b$ and at its lower end on the center of the disk of the valve $10^b$ and it has a thrust sufficient to force the valve and the stem $11^b$ into the downward position shown, unless opposed by a stronger force applied upward against the head of the stem. The parts $9^b$, $10^b$, 110, 111, $11^b$, $14^b$ and $15^b$ constitute the third form of emergency device.

A horizontal partition $16^b$ extends horizontally from the upper part of the casing $8^b$, above the inner end of the pipe $61^b$, to the lower part of the casing, to the left of the center, and it has a beveled valve seat, opening upward. A disk valve $17^b$, called the supply valve, is adapted to close, as shown, the seat of the partition $16^b$; and it has extending downward from near the circumference of the disk, guides, as before. An opening in the under side of the casing $8^b$ in axial alinement with the seat in the partition $16^b$, and of much greater diameter, is closed by a diaphragm 112, preferably of phosphor bronze, which is held in place at the circumference by a ring 113, bolted to the casing. A stem $18^b$ has secured to its top a flanged screw 114, that above the flange passes upward through the center of the diaphragm 112 and screws into the center of the lower end of the valve $17^b$. A threaded opening in the upper wall of the casing $8^b$ is in axial alinement with the seat of the partition $16^b$, but is of slightly greater diameter than the seat, and is closed by a nut plug 115. The parts $17^b$, 112, 113, 114, $18^b$, 26, 25, 24, 23, 22 and 28 constitute the third form of starter.

As before, the downward movement of the reciprocating parts between the valve $17^b$ and the diaphragm 23 is limited by the seating of the valve. There is a continuous passage from the left end to the right end of the casing $8^b$, through the partitions $16^b$ and $9^b$, that can be closed either by the valve $17^b$ or by the valve $10^b$. This form of construction is especially adapted for the transmission of a low pressure fluid such as fuel gas. The parts may be proportioned in view of the fact that standard artificial fuel gas contains 585 B. T. U. per cubic foot. It will be noted that the area of the diaphragm 112 is so much greater than the area of the valve $17^b$ that the pressure of gas entering from the pipe $61^b$ has a tendency to keep the valve closed. So, also, when the valve $17^b$ is open, in consequence of water flowing through the valve 41, the pressure on the diaphragm 110 tends to keep the valve $10^b$ open.

A supporting block 116 is bolted to the plate $1^b$ just below the lower right hand part of the casing $8^b$; and, in form, it is of much greater breadth than height and is cut away at the lower right hand corner. A long lever 117 is pivoted at the upper left hand face of the block 116. A compression spring 118 bears at its lower end against a bracket 119 projecting frontward from the lower center of the block 116 and at its top bears against the lower central part of the lever 117 so as to tend to thrust the lever upward. A bell crank lever 120 is pivoted to the right end of the block 116; it has an upper arm with a catch on top normally engaging the right end of the lever 117, so as to hold it in the position shown in opposition to the thrust of the spring 118; and it has an arm extending to the left and downward, with the lower end of the arm in the path of the lever, 56, when the latter lever ascends. A flat spring 121, secured at its left end to a bracket 122 projecting frontward from the block 116, bears upon the lever 120 so as to tend to rotate it counter-clockwise and thus to keep its catch in engagement with the lever 117. When the lever 117 is kept in the position shown by the catch of the lever 120, the thrust of the spring $15^b$ is such that the head at the lower end of the stem 11$^b$ is very close to the upper face of the lever 117, as shown. But when the lever 56 ascends high enough to engage and trip the lever 120, in opposition to the spring 121, the lever 120 releases the lever 117 and the spring 118 forces the lever 117 against the stem 11$^b$ so as quickly to close the valve 10$^b$ in opposition to the spring 15$^b$ and to any gas pressure exerted on the upper side of the diaphragm 110. Subsequently when the lever 56 drops, the lever 117 may be pressed down by hand, in opposition to the spring 118, until it is engaged by the lever 120, the latter lever at the same time being rotated slightly clockwise for an instant in opposition to the spring 121. The parts 116—122 constitute a quick closing device. This device may, if desired, be used with the construction of Figs. 1–5; but, in my opinion, the device in that connection is undesirable.

In Fig. 11, a hand valve 123 controls the pipe 61$^b$ and is normally open during the entire season of operation. The pipe 60$^b$ leads downward and terminates in a burner 124 running along beneath and parallel with a horizontal still casing 125. From the pipe 61$^b$, between the valve 123 and the casing 8$^b$, a narrow pipe leads downward and terminates in a pilot burner 126, which is in a position where its flame can light the burner 124. A three-way valve 41$^b$ controls not merely the right end of a pipe casing 40$^b$, but also a pipe 127 that leads downward from the casing into the upper left end of the casing 125, coils downward therein and emerges from its lower right end. The casing 125 is partially filled with water as an absorbent. When the handle of the valve 41$^b$ is in the position shown, it is to be understood that water is flowing through the pipe 127; that, when it is turned fully to the left, water is flowing through the right end of the pipe casing 40$^b$; and that, when it is in a neutral position, both passages are closed. From the top of the still 125 a pipe 128 leads to a check valve 129. From a check valve 130 a pipe 131 leads downward into the lower part of the casing 125. The pressure within the casing 125 and the pipes 128 and 129 is indicated by a gage 132, connected with the casing. The parts 125, 127, 128, 131 and 132 constitute one form of still and have a function similar to that of the compressors 64 and 108. The valves 130 and 129 have functions similar to those of the suction and discharge valves of a compressor and they are each so constructed that any excess of pressure on the respective outlet sides thereof has an intensive or cumulative effect in closing the valve. Valves of this description are disclosed in my aforesaid application Ser. No. 2,865, especially in Figs. 7 and 8 thereof. A hand expansion valve 133 controls the passage from the pipe 71 into the chamber 73. The pipe 67, instead of connecting with the condenser as in Figs. 5 and 9, so as to be directly controlled by the pressure in the condenser, is here connected with the pipe 128, so as to be directly controlled by the pressure in the still. This feature is disclosed in my aforesaid applications entitled Refrigerating machine and is claimed in my aforesaid application Ser. No. 2,865.

The method of operation of this third form of construction, connected as shown in Fig. 11, is as follows: With the handle of the valve 41$^b$ in the position shown, water is flowing through the pipe 127 so as to cool the contents of the still and to keep the temperature therein down say to about 90 degrees F. The valve 133 is also slightly open, so that liquid ammonia from the tank 66 and the pipe 71 passes the valve 133, and, vaporizing, produces the desired refrigerating effect in the compartments, not shown, which inclose the chamber 73. From the chamber 73 and the pipe 74 the expanded ammonia passes through the valve 130 and the pipe 131 into the lower part of the tank 125. As the gaseous ammonia thus entering the tank 125 is absorbed by the water in the tank, the heat of absorption is carried away by the water flowing through the pipe 127. During the continuance of the absorption period there is a gradual rise of pressure in the still, even although the temperature remains constant, starting at about 25 inches of vacuum as indicated by the gage 132, until, after several hours, a limit say of 30 pounds pressure is reached. At some such limit the valve 133 is closed and the handle of the valve 41$^b$ is turned fully to the left so as to shut off the flow of water into the still and to admit it to the right end of the pipe casing 40$^b$. Thereupon the water pressure on the diaphragm 23 opens the valve 17$^b$ and fuel gas, passing through the pipe 61$^b$, the casing 8$^b$, the pipe 60$^b$ and the burner 124, is ignited by the burner 126 and begins to heat the still and, in consequence of the heating, to separate the ammonia in the tank 125 from the water therein and to force it into the condenser, where it is cooled and liquefied under the action of pressure and the cooling effected by the flow of water from the casing 22, as before. This heating period is the only part of the cycle within which a dangerous pressure must be guarded against. Such a safeguarding is effected by my invention. The control of the valves 17$^b$ and 10$^b$ by the starter and the controller, and the graduation of the water supply through the instrumentality of the water regulator, during the heating period, are so similar to what has been described relative to the first form of construction that it is believed that further explanation is unnecessary. During the heating period the head pressure may be kept at 160 pounds and the emergency device, with the quick closing device interposed, may be set to act at 190 pounds. With the controller directly connected with the still, being the part of the system where any excessive pressure would originate, the possibility of a dangerous pressure in any part of the high pressure side arising from the operation of the machine is entirely eliminated. When the temperature of the still has risen to 300 degrees F., there having been no abnormal conditions resulting in the action of the emergency device, the valve 41 is turned to the neutral position, so that the valve 17$^b$ closes, the burner 124 is thereby extinguished and the flow of water through the condenser ceases. After the still has cooled down to about atmospheric temperature, there then being about 25 inches of vacuum as indicated by the gage 132, the handle of the valve 41$^b$ may be again turned to the position shown and another cycle of operation may be begun. If, however, the emergency device should act, the heating would stop and a new cycle of operation could not begin until the device is restored to its original position, which naturally would be after an investigation and a removal of the cause of the trouble.

In the first and second form of my invention, when used with compression machines, both as shown in Figs. 5 and 9 and also in actual practice, the structure can be manufactured as a separate device and can then be readily connected up with any machine. But in the third form of the invention, while Fig. 11 might indicate the same possibility, yet in actual practice the structure is intended to be made and used as an integral part of an automatic refrigerating machine, to the same extent as is the mechanism having similar functions disclosed in my aforesaid application Ser. No. 2,865.

The intermittent type of absorption machine indicated in Fig. 11 is made in capacities not exceeding a few tons. With large capacity continuous acting absorption machines, provided with an absorber and an ammonia pump and employing steam as the heating agent, the third form of the invention may be used in case exhaust steam is employed and the first form of the invention may be used in case high pressure live steam is employed.

The old style of intermittent absorption refrigerating machine, with a hand valve controlling the flow of condensing water and with another hand valve controlling the passage from the still into the condenser, was more liable to explosion than any other type of machine. But with my present mechanism, connected as indicated in Fig. 11 and with the check valve 129, the intermittent machine is the safest of all. The rise of pressure in the still is so gradual that not merely can the flow of condensing water and the interruption of the operation of the machine, when necessary, be controlled by the pressure in the still, but also this gradual rise makes impossible any accident analogous to the blowing out of the cylinder head of a compression machine. Furthermore, a maximum heat of 300 degrees in the still is lower than the temperature of the ammonia in a compressor cylinder at the end of the piston stroke. This fact, and the entire absence of lubricating oil in the system and the hermetically sealed condition of operation excluding the entrance of outside air through any shaft or rod opening, eliminate the troubles from non-condensable gases and reduce the occasions when the emergency device will act practically to two—first, the use of a too small or an ill designed condenser, and, second, a condition of foul condenser piping.

Next considering the construction of Figs. 12 and 13: A pipe 134 leads downward into the inlet of a T casing 135, which has at the right a lateral two way port connected with the pipe 40$^c$ and at the lower end an outlet in alinement with the inlet and of less capacity than the inlet and the pipe. A special three way valve 136 controls the passage through the casing 135. The casing 22$^c$ connects with the pipe 40$^c$ both as an inlet and an outlet. When the valve 136 is in the closed position shown, there is a free passage from the casing 22$^c$ and the pipe 40$^c$ through the valve and the outlet of the casing 135, so as to drain the water from under the diaphragm 23, but with any flow from the pipe 134 prevented. When the valve 136 is turned a quarter circle to the left, so that its inlet registers with the pipe 134, water flowing from the pipe passes through the valve and in part passes off through the outlet, but in part, owing to the less capacity of the outlet, passes through the two way port, the pipe 40$^c$ and the casing 22$^c$ so as to force upward the diaphragm 23 and the related parts above the diaphragm so as to start the transmission of operative energy.

From the outlet of the casing 135 a pipe 30$^c$ leads downward and then horizontally to the right below the casing 22$^c$ into the inlet at the left side of a casing 29$^c$, having an outlet from beneath into the pipe 65. Within the casing 29$^c$ is a curved partition 137, so constructed that between the lower part of the partition and the lower main wall of the casing there is a passage 138 always open. The capacity of the passage 138 is such that it permits a speedy draining away of water from under the diaphragm 23 when the valve 136 is closed and, with such limitation, it may be, if desired, considerably less than sufficient for transmitting the minimum quantity of water required by the condenser. The upper part of the partition 137 and a projecting rim from the main wall of the casing 29 form a valve seat for a clapper valve 139, which at the right end is secured to the inner end of a shaft 140 passing through the back wall of the casing. To the right of the partition 137 a large passage leads downward into the outlet of the casing 29°. When the valve 139 is lifted, less or more, water may flow through the valve seat over the top of the partition 137 and through the passage to the right of the partition so as to unite with water flowing from the passage 138. A cover 141 is bolted to the top of the casing 29° and may limit the upward swing of the valve 139. Secured to the rear and outside end of the shaft 140 is a short stout lever 142, which in Fig. 13 appears to extend to the right, but which actually extends to the left. A compression spring 143 at its lower end bears upon a bracket projecting backward from the rear of the casing 29° and on top presses upward against the under side of the outer end of the lever 142. A headed screw 144 is adapted to be screwed up or down in a threaded vertical opening through the lever 142 and is secured in any desired position by a locknut 145 just above the lever. The parts 29°, 137 and 139—145 constitute a second form of water regulator.

The construction of Figs. 12 and 13 can be substituted for the corresponding parts in any of the three main forms of construction of the preceding figures. The parts are shown in a position where the lever 56 is bearing downward upon the screw 144 so as to close, by means of the parts 142 and 140, the valve 139. In this form of construction the parts of the entire mechanism should be so spaced that the diaphragm 44 in its downward movement is not actually limited by the stops 43, but shall stop before that limit in consequence of the lever 56 bearing upon the screw 144 so as to close the valve 139. When the pressure on the under side of the diaphragm 44 forces upward the related parts above the diaphragm, the spring 143 causes the screw 144 to follow the lever 56 upward so as to less or more open the valve 139. In this second form of water regulator the secondary adjustment is effected by the screw 144 and the nut 145. While the parts are more numerous, the advantage of the present construction is that any slight pulsations or fluctuations of the water supply, not amounting to an inadequacy of flow, will not permit a dropping of the diaphragm 23 and a consequent cessation of the transmission of operative energy. For it is apparent that water entering the pipe 134 and unable to escape through the pipe 30° must exert its force constantly in keeping the diaphragm 23 in an elevated position. In the second form of water regulator, the water entering from the pipe 30° and unable to escape through the passage 138 tends to force the valve 139 open, even if the spring 143 is weak or broken. In this form of construction the parts 135, 40°, 22°, 23, 28, 30°, 29° and 141 constitute the reservoir leading into the piping 65 and the parts 134 and 136 are the means for supplying a flow of water to the reservoir.

Next considering the construction of Fig. 14: A T casing 146 has at the left an inlet leading from the pipe 40; it has a two way port in alinement with the inlet and connecting with the pipe 40°; and it has at the lower end an outlet leading downward into the pipe 30° and of less capacity than the inlet and the pipe 40. The valve 41 controls the passage through the pipe 40. This construction is a permissible substitute for the parts 135 and 136 of Fig. 12 and thus dispenses with the special valve 136. Furthermore, when the valve 41 is open, the tendency of the water is to shoot across into the pipe 40° so as very firmly to keep the diaphragm 23 lifted.

The casing 22° may be of any convenient size and shape and the passage thereinto and therefrom, as will be presently suggested by way of example, may be at any part of its wall and at any angle to the diaphragm 23. But it is essential that the parts be so positioned that the water can freely drain away from under the diaphragm 23 upon a cessation of the water supply. The above referred to suggestion is this: The outlet end of the casing 146 may be connected with the opening in the bottom wall of the casing 22°, which the plug 28 is shown as occupying, and the opening in the left side of the casing will then be plugged. With the casing 146 so connected, its two way port will then be connected with a straight horizontal coupling, such as the coupling 30, leading into the casing 29°.

Next considering the construction of Figs. 15 and 16, intended, if desired, as a substitute for certain parts shown in Figs. 6–9: The block 80° is of only sufficient length to serve as a contact for the right end of the switch 91. All parts of the plate 75 and the block 79 to the right of a vertical line coincident with the right edge of the block 80°, and also all connected electrical parts, are to be understood as omitted. A bracket 148 may be screwed or bolted to the plate 1ª and it extends at the top frontward so as to support an insulated contact 149, with which the wire 104 is connected. A rock shaft 150 is journaled in an opening through the bracket 148 but is insulated therefrom and carries at its end in front of the bracket a contact arm 151, normally in a position of sliding contact with the contact 149. Secured to but insulated from the bracket 148 is a spring contact 152, operative to keep in contact with the arm 151 in whatever position the latter may be. A wire 153 connects the contacts 152 and 80°. Secured to the end of the shaft 150 back of the bracket 148 is a weight arm ending in a globular weight 154 at the top and having projecting to the right of the shaft an upper limit arm 155 and a lower limit arm 156. A pin 157 projects from back of the plate 148 and, when the weight 154 is to the right of the vertical center of the shaft 150, in a position, as shown, with the arm 151 in contact with the contact 149, the pin prevents the weight from falling farther to the right. Another pin 158 projects from the back of the plate 148, at a position to the left of the pin 157, and prevents the weight 154 from falling too far to the left. An actuating pin 159 projects frontward from the left end of the lever 56. When the lever 56 is sufficiently lifted, the pin 159 engages the arm 155 so as to throw the weight 154 to the left of the vertical center of the shaft 150, as far as the pin 158 permits, but sufficiently for the arm 151 to break connection with the contact 149. When the lever 56 subsequently descends, the position of the arm 156 is such that, after a certain movement downward, the pin 159 engages the arm so as to throw the weight 155 to the right of the vertical center of the shaft 150, as far as the pin 157 permits, but sufficiently for the arm 151 again to make connection with the contact 149. With the wire 104 connected as shown in Fig. 9 and with the lever 56 operating as just described, it is apparent that, as before, the motor 100 and the compressor 108 are automatically stopped in case of excessive pressure and that, furthermore, when the condenser pressure drops back to normal, their operation is automatically resumed. This modified construction, therefore, has results somewhat similar to what has been described in relation to the engine driven compressor of the first form of construction.

Finally considering the construction of Fig. 17: A special form of bell crank lever 77° has a finger projecting to the left just above and normally almost touching the top of the right end of the lever 84. But when the lever 56 trips the lever 77° so as to release the arm 84, as has been described, if the arm should adhere to the contact 83, the continued ascent of the lever 56 will soon cause the finger of the lever 77° to force the arm out of such contact. This construction makes absolutely certain the stopping of the compressor in case of excessive head pressure and renders the spring 87 unnecessary.

In the various forms of construction there are means for transmitting operative energy, which energy may be a fluid such as steam or gas or it may be the electric current.

In the various forms of construction, the diaphragm 23 is to be understood to be one form of movable wall moving outward upon a filling of the water reservoir and moving inward upon a cessation of the inflow into the reservoir. And it is to be noted that an inflow of water into the reservoir, whether upon an opening of the valve 41 or upon a resumption of the supply, is normally the sole means for causing a starting of the forcing means and that a cessation of the flow, whether from a closing of the valve or from a cessation of the supply, in the absence of an abnormal pressure caused by the forcing means so excessive as to actuate the emergency device, is the sole means for causing a shutting off of the power that operates the forcing means. In other words, the mechanism actuated by the movements of the diaphragm 23 is not a mere safety device. By my construction, any special valve or switch, as the case may be, in the conductors of the operative energy to the forcing means, is rendered unnecessary. And especially is it true that my construction secures a greater certainty of action. For if the non-flow of condensing water were utilized to actuate a safety device to shut off the power only in case of a failure of the water supply, it might act so seldom as to get out of order without its condition being detected. By using the inflow and the non-flow of condensing water as the sole means for normally starting and stopping the forcing means it is necessary to provide, as has been done in my construction, a passage always open for the escape of water from the reservoir. It is also to be noted, in my construction, by a division of operative effects, that the failure of the water supply, which is the ordinary cause of excessive pressure and which usually occurs suddenly, acts at once to stop the forcing means; that a resumption of the supply again starts the forcing means; and that the emergency device acts only when the maximum flow of condensing water has failed to prevent a very abnormal pressure, caused by some such infrequent condition as foul condenser piping, or the presence of non-condensable gases, or a too small condenser, or an ill designed condenser, in all of which latter conditions the rise of pressure is almost always gradual. Consequently, before the emergency device acts in any one of these extreme cases, there is a chance to discover and to remedy the condition. There are also disclosed three varieties of emergency devices that operate: either (a) to stop the forcing means absolutely; or (b) to stop the forcing means and to start it again as the pressure decreases to normal; or (c) to throttle the supply of energy transmitted before entirely shutting off the supply and to reverse such action as the pressure again decreases to normal. It is, however, to be noted that, in the case of compressors, my construction does not relieve the troubles that may arise from liquid ammonia or the like getting in front of an advancing piston, or from a broken cylinder discharge valve or other broken part falling in front of the piston, or from atmospheric air leaking in through a stuffing box and mingling with the lubricating oil.

It is to be noted that, while in Figs. 5 and 9 the pipe 67 is so connected that the diaphragm 44 is directly affected by the changes of condenser pressure and in Fig. 11 the pipe is so connected that the diaphragm is directly affected by the changes of pressure in the still or generator, yet in all the forms of construction the diaphragm and the controller bearing thereon, and through them the water regulator and the emergency device, are controlled, broadly speaking, by the head pressure of the apparatus. It is also to be noted that the controller, the regulator and the emergency device are capable of being used independently of the particular means herein disclosed for normally starting and stopping the forcing means; and, furthermore, that the controller and the regulator are capable of being used independently of the emergency device and that the controller and the emergency device are capable of being used independently of the regulator.

What I have invented and what I desire to have protected by Letters Patent is expressed in claims as follows:

I claim:

1. In combination, a condenser including water piping, a reservoir discharging downward into the piping, a regulator controlling the opening from the reservoir through the piping, energy operated forcing means for forcing fluid into the condenser, and means controlled by the head pressure to act upon the regulator to vary the flow through the piping according to the variations of such pressure.

2. In combination, a condenser including water piping, a reservoir discharging downward into the piping, a regulator controlling the opening from the reservoir through the piping, energy operated forcing means for forcing fluid into the condenser, means controlled by conditions in the reservoir to permit a starting and to cause a stopping of the forcing means, and means controlled by the head pressure to act upon the regulator to vary the flow through the piping according to the variations of such pressure.

3. In combination, a condenser including water piping, a reservoir discharging downward into the piping, a regulator controlling the opening from the reservoir through the piping, energy operated forcing means for forcing fluid into the condenser, and means controlled by the head pressure to act upon the regulator to vary the flow through the piping according to the variations of such pressure and in case of an excessive pressure interrupting such operation.

4. In combination, a condenser including water piping, a reservoir discharging downward into the piping, a regulator controlling the opening from the reservoir through the piping, energy operated forcing means for forcing fluid into the condenser, means controlled by conditions in the reservoir normally to permit a starting and to cause a stopping of the forcing means, and means controlled by the head pressure to act upon the regulator to vary the flow through the piping according to the variations of such pressure and in case of an excessive pressure interrupting such operation.

5. In combination, a condenser including water piping, a regulator positioned in the line of the piping for permitting a constant minimum flow therethrough and for varying the flow above such minimum up to a maximum, energy operated forcing means for forcing fluid into the condenser, and means controlled by the head pressure to act upon the regulator to decrease such flow toward the minimum as the pressure falls and to increase the flow toward the maximum as the pressure rises.

6. In combination, a condenser including water piping, a regulator positioned in the line of the piping for permitting a constant minimum flow therethrough and for varying the flow above such minimum up to a maximum, energy operated forcing means for forcing fluid into the condenser, an emergency device for interrupting the operation of the forcing means, and means controlled by the head pressure to act upon the regulator to decrease such flow toward the minimum as the pressure falls and to increase the flow toward the maximum as the pressure rises and upon the device to interrupt such operation in case of an excessive rise of pressure.

7. In combination, a condenser including water piping, a reservoir discharging into the piping, energy operated forcing means for forcing fluid into the condenser, and throttling means positioned in the line of the piping, permitting a constant minimum flow therethrough and controlled by the head pressure to vary such flow between such minimum limit and a maximum according to the variations of such pressure.

8. In combination, a condenser including water piping, a reservoir discharging into the piping, energy operated forcing means for forcing fluid into the condenser, and throttling means positioned in the line of the piping, permitting a constant minimum flow therethrough and controlled by the head pressure to vary such flow between such minimum limit and a maximum according to the variations of such pressure and in case of an excessive pressure to interrupt such operation.

9. In combination, a condenser including water piping, a reservoir discharging downward into the piping, energy operated forcing means for forcing fluid into the condenser, and means actuated by the pressure of liquid in the reservoir to permit the transmission of energy to the forcing means.

10. In combination, a condenser including water piping, a reservoir discharging downward into the piping, energy operated forcing means for forcing fluid into the condenser, means actuated by the pressure of liquid in the reservoir to permit the transmission of energy to the forcing means, and means suspending such transmission upon a cessation of such pressure.

11. In combination, a condenser including water piping, a reservoir discharging downward into the piping, energy operated forcing means for forcing fluid into the condenser, means actuated by the pressure of liquid in the reservoir to permit the transmission of energy to the forcing means, and means controlled by the head pressure for varying the flow through the piping.

12. In combination, a condenser including water piping, a reservoir discharging downward into the piping, energy operated forcing means for forcing fluid into the condenser, means actuated by the pressure of liquid in the reservoir to permit the transmission of energy to the forcing means, means controlled by the head pressure for varying the flow through the piping, and means suspending such transmission upon a cessation of such pressure.

13. In combination, a condenser, a water supply conduit therefor, energy operated forcing means for forcing fluid into the condenser, means actuated by liquid under pressure flowing in the conduit to permit the transmission of energy to the forcing means, and means controlled by the head pressure for varying the flow through the conduit.

14. In combination, a condenser, a water supply conduit therefor, energy operated forcing means for forcing fluid into the condenser, means actuated by liquid under pressure flowing in the conduit to permit the transmission of energy to the forcing means, means controlled by the head pressure for varying the flow through the conduit, and means suspending such transmission upon a cessation of the pressure of the liquid.

15. In combination, a condenser, a water supply conduit therefor, energy operated forcing means for forcing fluid into the condenser, motor means actuated by liquid under pressure flowing in the conduit to permit the transmission of energy to the forcing means, and means controlled by the head pressure for varying the flow of liquid that has passed the motor means.

16. In combination, a condenser, a water supply conduit therefor, energy operated forcing means for forcing fluid into the condenser, motor means actuated by liquid under pressure flowing in the conduit to permit the transmission of energy to the forcing means, means controlled by the head pressure for varying the flow of liquid that has passed the motor means, and means suspending such transmission upon a cessation of the pressure of the liquid.

17. In combination, a condenser, a water supply conduit therefor, a compressor leading into the condenser, an engine for driving the compressor, a fluid conduit for transmitting fluid to operate the engine, a valve controlling the fluid conduit, and means actuated by liquid under pressure flowing in the water supply conduit to open the valve and closing it upon a cessation of the pressure of the liquid.

18. In combination, a condenser, a water supply conduit therefor, a compressor leading into the condenser, an engine for driving the compressor, a fluid conduit for transmitting fluid to operate the engine, a valve controlling the fluid conduit, means actuated by liquid under pressure flowing in the water supply conduit to open the valve and closing it upon a cessation of the pressure of the liquid, and means controlled by the head pressure for varying the flow through the water supply conduit.

19. In combination, a condenser including water piping, a reservoir discharging downward into the piping, a compressor leading into the condenser, an engine for driving the compressor, a conduit for transmitting fluid to operate the engine, a valve controlling the conduit, means actuated by the pressure of liquid in the reservoir to open the valve, and means closing the valve upon a cessation of such pressure.

20. In combination, a condenser including water piping, a reservoir discharging downward into the piping, a compressor leading into the condenser, an engine for driving the compressor, a conduit for transmitting fluid to operate the engine, a valve controlling the conduit, means actuated by the pressure of liquid in the reservoir to open the valve, means closing the valve upon a cessation of such pressure, and means controlled by the head pressure for varying the flow through the piping.

21. In combination, a condenser, a water conduit therefor, motor means positioned in advance of the condenser, permitting a part of the wall of the conduit to move outward in response to internal liquid pressure thereon and forcing it inward upon a cessation of such pressure, an energy driven compressor leading into the condenser, means suspending the transmission of energy to the driving means upon such inward movement, and means tending as the head pressure falls to restrict the flow of liquid that has passed the motor means and as the pressure rises to increase such flow.

22. In combination, a condenser, a water conduit therefor, motor means positioned in advance of the condenser, permitting a part of the wall of the conduit to move outward in response to internal liquid pressure thereon and forcing it inward upon a cessation of such pressure, a compressor leading into the condenser, energy operated driving means for driving the compressor, means upon such outward movement permitting the transmission of energy to the driving means and suspending such transmission upon such inward movement, and means tending as the head pressure falls to restrict the flow of liquid that has passed the motor means and as the pressure rises to increase such flow.

23. In combination, a condenser, a compressor leading into the condenser, an engine for driving the compressor, a conduit for transmitting fluid to operate the engine, a valve controlling the conduit, and means closing the valve as the head pressure increases to an excessive limit and opening it as the pressure decreases to normal.

24. In combination, a condenser, a compressor leading into the condenser, an engine for driving the compressor, a conduit for transmitting fluid to operate the engine, a supply valve controlling the conduit, an emergency valve controlling the conduit in series with the supply valve, and means closing the emergency valve as the head pressure increases to an excessive limit and opening it as the pressure decreases to normal.

25. In combination, a condenser, a compressor leading into the condenser, an engine for driving the compressor, a conduit for transmitting fluid to operate the engine, a valve controlling the conduit, a device tending to open the valve, and means controlled by the head pressure, closing the valve in opposition to the device as the pressure increases to an excessive limit and permitting the device to act according to its tendency as the pressure decreases to normal.

26. In combination, a condenser including water piping, a compressor leading into the condenser, an engine for driving the compressor, a conduit for transmitting fluid to operate the engine, means graduating the flow through the piping to maintain a normal head pressure, a valve controlling the conduit, and means closing the valve as the head pressure increases to an excessive limit and opening it as the pressure decreases to normal.

27. In combination, a condenser including water piping, a compressor leading into the condenser, an engine for driving the compressor, a conduit for transmitting fluid to operate the engine, a supply valve controlling the conduit, means graduating the flow through the piping to maintain a normal head pressure, an emergency valve controlling the conduit in series with the supply valve, and means closing the emergency valve as the head pressure increases to an excessive limit and opening it as the pressure decreases to normal.

28. In combination, a condenser, energy operated forcing means for forcing fluid into the condenser, and means controlled by the head pressure and operating in case such pressure becomes excessive to throttle the transmission of operative energy to the forcing means and upon a further rise of pressure to suspend such transmission.

29. In combination, a condenser, energy operated forcing means for forcing fluid into the condenser, and means controlled by the head pressure and operating in case such pressure becomes excessive to throttle the transmission of operative energy to the forcing means and upon a further rise of pressure to suspend such transmission and reversing such action as the pressure decreases to normal.

30. In combination, a condenser including water piping, energy operated forcing means for forcing fluid into the condenser, and means controlled by the head pressure to graduate the flow through the piping for maintaining such pressure within normal limits but operating in case the pressure becomes excessive to throttle the transmission of operative energy to the forcing means and upon a further rise of pressure to suspend such transmission.

31. In combination, a condenser including water piping, energy operated forcing means for forcing fluid into the condenser, and means controlled by the head pressure to graduate the flow through the piping for maintaining such pressure within normal limits but operating in case the pressure becomes excessive to throttle the transmission of operative energy to the forcing means and upon a further rise of pressure to suspend such transmission and reversing such action as the pressure decreases to normal.

32. In combination, a condenser, energy operated forcing means for forcing fluid into the condenser, an emergency device for decreasing or suspending the transmission of operative energy to the forcing means, a lever device for actuating the emergency device, a diaphragm subject to the head pressure of the forcing means, and a motor mem-